(12) United States Patent
Cho et al.

(10) Patent No.: US 8,144,655 B2
(45) Date of Patent: Mar. 27, 2012

(54) METHOD OF SCHEDULING BROADCAST MESSAGES FOR TRANSMITTING SYSTEM INFORMATION

(75) Inventors: Hee Jeong Cho, Anyang-Si (KR); Tae Gon Kong, Anyang-Si (KR); Ki Seon Ryu, Anyang-Si (KR); Ae Ran Youn, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 598 days.

(21) Appl. No.: 12/343,976

(22) Filed: Dec. 24, 2008

(65) Prior Publication Data

US 2009/0175247 A1  Jul. 9, 2009

(30) Foreign Application Priority Data

Dec. 28, 2007  (KR) .................. 10-2007-0140027

(51) Int. Cl.
  *H04W 4/00* (2009.01)
(52) U.S. Cl. ....................................... 370/329
(58) Field of Classification Search ............ 370/329
  See application file for complete search history.

(56) References Cited

U.S. PATENT DOCUMENTS

| | | | |
|---|---|---|---|
| 2006/0009228 A1 * | 1/2006 | Kang et al. | 455/450 |
| 2006/0148467 A1 | 7/2006 | Kreitzer et al. | |
| 2007/0058523 A1 * | 3/2007 | Cho et al. | 370/208 |
| 2007/0147360 A1 | 6/2007 | Vogl et al. | |
| 2007/0183380 A1 | 8/2007 | Rensburg et al. | |

* cited by examiner

*Primary Examiner* — Ricky Ngo
*Assistant Examiner* — Richard K Chang
(74) *Attorney, Agent, or Firm* — Birch, Stewart, Kolasch & Birch, LLP

(57) ABSTRACT

A method for scheduling broadcast messages to transmit system information is disclosed. This method for scheduling broadcast messages having system information classifies a plurality of system information into one or more groups. For example, the system information may be control information for a network entry and initialization of a mobile station, or a burst profile. Then, the scheduling method allocates different numbers of transmission times to the individual groups, and determines transmission start times of system information of the individual groups according to the allocated transmission times.

11 Claims, 9 Drawing Sheets

METHOD OF SCHEDULING BROADCAST MESSAGES FOR TRANSMITTING SYSTEM INFORMATION

This application claims the benefit of the Korean Patent Application No. 10-2007-0140027, filed on Dec. 28, 2007, which is hereby incorporated by reference as if fully set forth herein.

BACKGROUND OF THE INVENTION

1. Field of the Invention

The present invention relates to a Network Entry and Initialization process of a terminal, and more particularly to a method for scheduling broadcast messages to reduce a time consumed for carrying out the network entry and initialization process of terminals.

2. Discussion of the Related Art

In a broadband wireless access system, whenever each terminal is powered on, misses its cell, or moves from one cell to another cell, it performs a network entry and initialization process of terminals.

FIG. 1 is a flow chart illustrating the network entry and initialization process.

Referring to FIG. 1, a terminal scans a downlink (DL) channel, and establishes synchronization with a base station (BS) at step S110. The terminal receives the step S110 by receiving a preamble, a downlink MAP (DL-MAP), and a Downlink Channel Description) (DCD) message from the base station (BS).

If the terminal has established synchronization with the base station (BS), it obtains uplink parameters (i.e., Tx parameters) from the Uplink Channel Descriptor (UCD) message at step S120.

Then, the terminal performs a ranging process, and performs an automatic adjustment process at step S130.

Next, the terminal negotiates basic capabilities with the base station (BS) at step S140.

If the basic capability negotiation is completed, the base station (BS) authorizes a subscriber station (SS), and performs a key exchange at step S150. The step S150 can be carried out only when the base station (BS) and the subscriber station (SS) support the authorization policy, but it may be unnecessary.

Next, the subscriber station (SS) performs a registration process in the base station (BS) at step S60.

A step S170 for establishing IP connectivity, a step S180 for establishing 'time of day', and a step S190 for transferring operational parameters may be carried out according to either first information indicating the support or non-support of the BS and SS or second information indicating selection of the SS.

FIG. 2 is a flow chart illustrating a downlink synchronization process of the terminal.

FIG. 2 shows detailed operations of the step S110 for performing downlink synchronization with the base station (BS) in the network entry and initialization process.

Referring to FIG. 2, the subscriber station (SS) searches for a frame in an arbitrary channel (e.g., an i-th channel) at step S210, and begins to search for a preamble until detecting a valid downlink signal at step S220.

If the preamble is detected at step S220, the subscriber station (SS) establishes physical synchronization of frequency and time using the detected preamble. Also, if the subscriber station (SS) receives a DL-MAP message at step S230, it establishes MAC synchronization at step S260, and starts operating T1 and T12 timers at steps S240~250.

In the meantime, if the subscriber station (SS) does not detect the preamble or does not receive the DL-MAP, it goes to the next channel at step S235, and searches for a frame at step S210. Namely, the subscriber station (SS) repeats the steps S235 and S210 until detecting the preamble or receiving the DL-MAP.

FIG. 3 is a flow chart illustrating a process for maintaining the downlink synchronization of FIG. 2.

Referring to FIG. 3, if the subscriber station (SS) has successfully received DL-MAP and DCD messages within a lost DL-MAP interval or a T1 interval at step S310, it maintains downlink synchronization and initializes a corresponding timer at step S320. In this case, 'T1' can be represented by the following equation 1:

$$T1 = 5 \times DCD \text{ interval maximum value} \qquad \text{[Equation 1]}$$

In Equation 1, 'DCD interval maximum value' is set to 10 seconds. In this case, if the subscriber station (SS) does not receive any of corresponding messages until a timer associated with each message expires, the subscriber station (SS) starts searching for a new downlink signal at step S330.

FIG. 4 is a flow chart illustrating a method for allowing a terminal to acquire uplink-associated parameters.

FIG. 4 shows detailed operations of the step S120 for receiving uplink-associated parameters in the network entry and initialization process.

Referring to FIG. 4, the subscriber station (SS) establishes downlink synchronization with the base station (BS) at step S410, and waits for a UCD message to acquire uplink-associated information.

If the subscriber station (SS) does not receive the UCD message until the T12 timer expires, or if the received UCD message is improper for the subscriber station (SS), the SS retries to perform a first process of the network entry and initialization process. Namely, the SS retries to perform a downlink channel search process S480. In this case, 'T12' can be represented by the following equation 2:

$$T12 = 5 \times UCD \text{ interval maximum value} \qquad \text{[Equation 2]}$$

In Equation 2, 'DCD interval maximum value' is set to 10 seconds.

If the subscriber station (SS) receives the UCD message before the T12 timer expires at step S420, it waits for an UL-MAP message for a selected channel. In this case, if the uplink channel is available at step S430, the subscriber station (SS) acquires uplink parameters at step S440, resets the T12 timer, and maintains uplink information.

FIG. 5 is a flow chart illustrating a process for maintaining uplink-associated parameters of FIG. 4.

Referring to FIG. 5, if the subscriber station (SS) has successfully received UL-MAP and UCD messages within a given time (i.e., lost UL-MAP interval or T12 interval) at step S510, it maintains valid uplink information, and resets the T12 timer at step S520.

In the meantime, it the subscriber station (SS) has not received the corresponding messages until timers associated with individual messages have expired, the SS determines that uplink-associated information is invalid, and deletes uplink channel parameters at step S530.

Thereafter, the subscriber station (SS) starts detecting a new downlink signal at step S540.

FIG. 6 is a conventional flow chart illustrating a network entry and initialization process.

In more detail, FIG. 6 shows a flow chart of messages generated while steps before the SS ranging are performed. In this case, it is assumed that DL-MAP and UL-MAP messages are transmitted to each frame during a frame duration interval of 20 ms. Also, it is assumed that a DCD or UCD transmission interval is set to a maximum value of 10 s.

The base station (BS) transmits a preamble, a DL-MAP, a UL-MAP at intervals of 20 ms at steps S601 and S602. Although the mobile station (MS) is powered on at step S603 and receives other messages other than the preamble, it is unable to recognize the received messages at step S604.

The mobile station (MS) enters its synchronization status at step S606, after receiving the preamble and the DL-MAP at step S605. Then, the mobile station (MS) waits to receive the DCD message from the base station (BS) at step S607. The mobile station (MS) receives the DCD message at step S608 and obtains downlink-associated parameters. Then, the mobile station (MS) waits to receive the UCD message from the base station (BS) at step S609.

The mobile station (MS) receives the UCD message at step S610, obtains uplink-associated parameters at step S611, and waits for information of resources allocated for the initial ranging at step S612.

If the mobile station (MS) obtains the resource information from the UL-MAP message at steps S613 and S614, it transfers a CDMA code according to the initial ranging procedure at step S615.

As described above, in order to perform the ranging process, the mobile station (MS) must sequentially read a plurality of messages (i.e., preamble, DL-MAP, DCD, UCD, and UL-MAP) in the order of preamble→DL-MAP→DCD→UCD→UL-MAP. If the DCD or UCD transmission interval is set to a maximum time of 10 s, the above-mentioned conventional art may be ineffective from the viewpoint of a time consumed for carrying out the network entry and initialization process of mobile stations.

SUMMARY OF THE INVENTION

An object of the present invention is to provide a method for scheduling broadcast messages, wherein a base station (BS) classifies system information, which must be broadcast to mobile stations, into several sub-information according to a specific reference, without simultaneously transferring the system information to mobile stations, broadcasts the classified information to the mobile stations according to different patterns, such that each mobile station can carry out a Network Entry and Initialization process as soon as it receives the system information needed for a network entry and initialization process.

To achieve these objects and other advantages and in accordance with the purpose of the invention, as embodied and broadly described herein, a method for scheduling broadcast messages including system information includes: classifying a plurality of system information into one or more groups, in which each system information includes at least one of control information for a network entry and initialization of a mobile station (MS) or a burst profile; and allocating different numbers of transmission times to the individual groups, and determining transmission start times of system information of the individual groups according to the allocated transmission times.

The determining step of the transmission start times may include: performing a scheduling process, which allows system information of a specific group having the highest number of transmission times to have a transmission start time denoted by a specific frame interval, and allows system information of another group having the lowest number of transmission times to have a DCD or UCD transmission interval.

In another aspect of the present invention, there is provided a method for scheduling broadcast messages including system information including: determining transmission start times, at which the system information of the individual groups will start transferring, according to group information and the number of transmission times allocated to the individual groups, in which the group information is made by classifying the system information having at least one of control information for a network entry and initialization of a mobile station (MS) or a burst profile into one or more groups; and transmitting the system information of a corresponding group using an MAP message at a transmission start point of each group.

The determining step of the transmission start times may include: performing a scheduling process such that the system information of the individual groups can be transferred different number of times.

The system information may include system information of a DCD.

The group information may allow a specific group, to which the highest number of transmission times is allocated, to have at least one of TTG, RTG, and EIRxPIR,max.

The DCD system information may be contained in a DL channel information IE defined by an extended-2 DIUC reserved area from among downlink interval usage codes (DIUCs).

The system information may include system information of a UCD.

The group information may allow a specific group having the highest number of transmission times to include information associated with an initial ranging and other information associated with a transmission power, in which the initial ranging-association information includes at least one of an initial ranging code, a start point of a ranging code group, and an initial ranging backoff start point.

The UCD system information may be contained in a UL channel information IE defined by an extended-2 DIUC reserved area from among uplink interval usage codes (UIUCs).

In another aspect of the present invention, there is provided a method for scheduling broadcast messages including system information including: determining transmission start times, at which the system information of the individual groups will start transferring, according to group information and the number of transmission times allocated to the individual groups, in which the group information is made by classifying the system information having at least one of control information for a network entry and initialization of a mobile station (MS) or a burst profile into one or more groups; and transmitting the system information of a corresponding group using a downlink burst area at a transmission start time of each group.

The determining step of the transmission start times may include: performing a scheduling process such that the system information of the individual groups can be transferred different number of times.

The group information is classified into at least two groups including a high repetition group and a low repetition group according to a transmission frequency number of the system information, in which the highest number of transmission times is allocated to the high repetition group and the lowest number of transmission times is allocated to the low repetition group. The transmitting of the system information of the corresponding group may include: transmitting the system information of the high repetition group at intervals of a specific frame, and transmitting the system information of low repetition group at intervals of DCD or UCD transmission.

The group information may allow the high repetition group to include at least one of TTG, RTG, and EIRxPIR,max.

The high repetition group may include information associated with an initial ranging and other information associated with a transmission power, in which the initial ranging-association information includes at least one of an initial ranging code, a start point of a ranging code group, and an initial ranging backoff start point.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

The following embodiments of the present invention may be modified into various formats, and the scope of the present invention is not limited to only the following embodiments and can also be applied to other examples.

The following embodiments of the present invention include a method for classifying a variety of system information contained in a DCD or UCD message according to a specific reference, and performing distribution of the classified information.

A base station (BS) may classify a plurality of system information contained in a DCD or UCD into a high repetition group (HRG), a middle repetition group (MRG), a low repetition group (LRG), and so on, in consideration of a transmission frequency number, characteristics of corresponding information, etc.

For example, specific information to be contained in 'HRGD$_{DCD}$' among DCD system information may be TTG, RTG, EIRxPIR,max and some downlink burst profiles. Information to be contained in the 'HRG$_{DCD}$' information may include a variety of initial ranging information, for example, initial ranging codes needed for performing an initial ranging, a start point of a ranging code group (i.e., Start of ranging codes group), and a backoff start point of the initial ranging (Initial_ranging_backoff_start). Also, the information to be contained in the 'HRG$_{DCD}$' information may include an 'MS-specific up power offset adjustment step' needed for controlling a transmission power, an 'MS-specific down power offset adjustment step' transmission power associated information such as 'Minimum level of power offset adjustment', and some uplink burst profiles.

In the meantime, DCD or UuCD system information contained in the middle repetition group is transferred using resources which have been previously occupied to transfer the high repetition group.

DCD or UCD system information contained in the low repetition group is transferred using resources which have been previously occupied to transfer the high repetition group. In this case, the number of transmission times of the low repetition group may be set to '1' during a DCD or UCD transmission interval.

Figure 7:
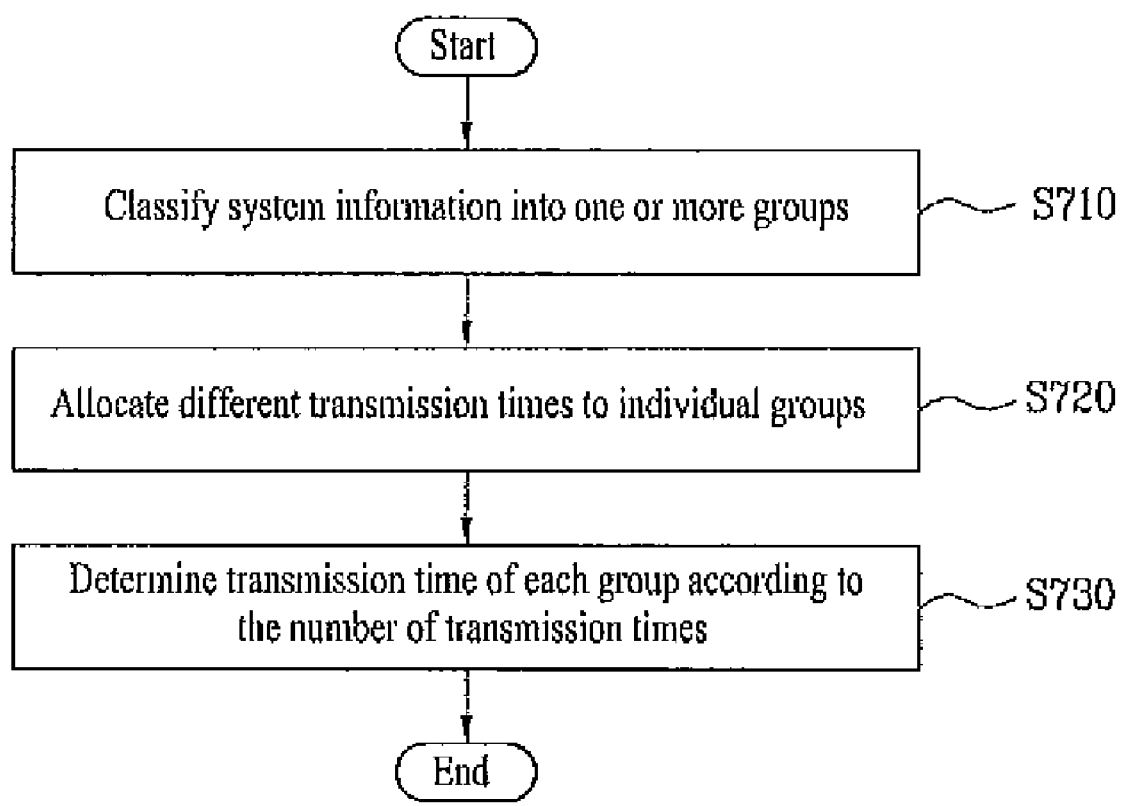
FIG. 7 is a flow chart illustrating a method for scheduling broadcast messages according to one embodiment of the present invention.

FIG. 7 is a flow chart illustrating a method for scheduling broadcast messages according to one embodiment of the present invention.

Referring to FIG. 7, a variety of system information units, for example, control information and burst profiles for the network entry and initialization process of the mobile station (MS) in association with an uplink and a downlink, and a burst profile, are classified into one or more groups at step S710. For the convenience of description, information indicating the classified groups will hereinafter be referred to as 'group information'.

Next, different transmission times (i.e., different 'Count' values) are assigned to individual groups at step S720. The above-mentioned system information units are classified into three groups, i.e., a high repetition group (HRG), a middle repetition group (MRG), and a low repetition group (LRG), it is preferable that the 'Count' values of the individual groups may satisfy the following equation 3 during a DCD or UCD transmission interval.

$$\text{Count}_{HRG} > \text{Count}_{MRG} > \text{Count}_{LRG} \qquad \text{[Equation 3]}$$

Finally, a transmission start time point, at which the system information units of individual groups will start transferring, are decided according to the number of allocated transmission times (i.e., 'Count' values) at step S730.

Figure 8:
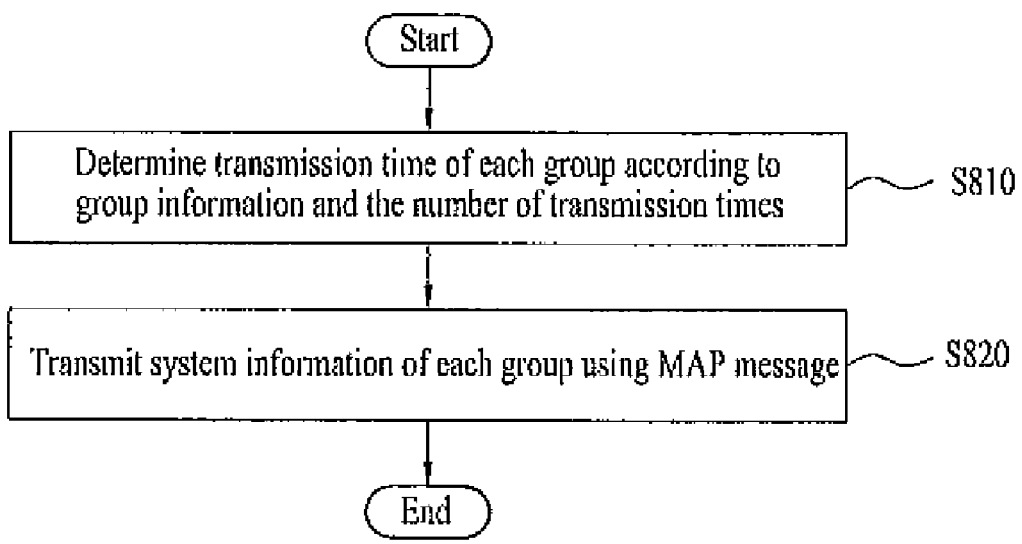
FIG. 8 is a flow chart illustrating a method for scheduling broadcast messages according to another embodiment of the present invention.

The classified system information may be broadcast using an MAP message as shown in FIG. 8.

FIG. 8 is a flow chart illustrating a method for scheduling broadcast messages according to another embodiment of the present invention.

Figure 1:
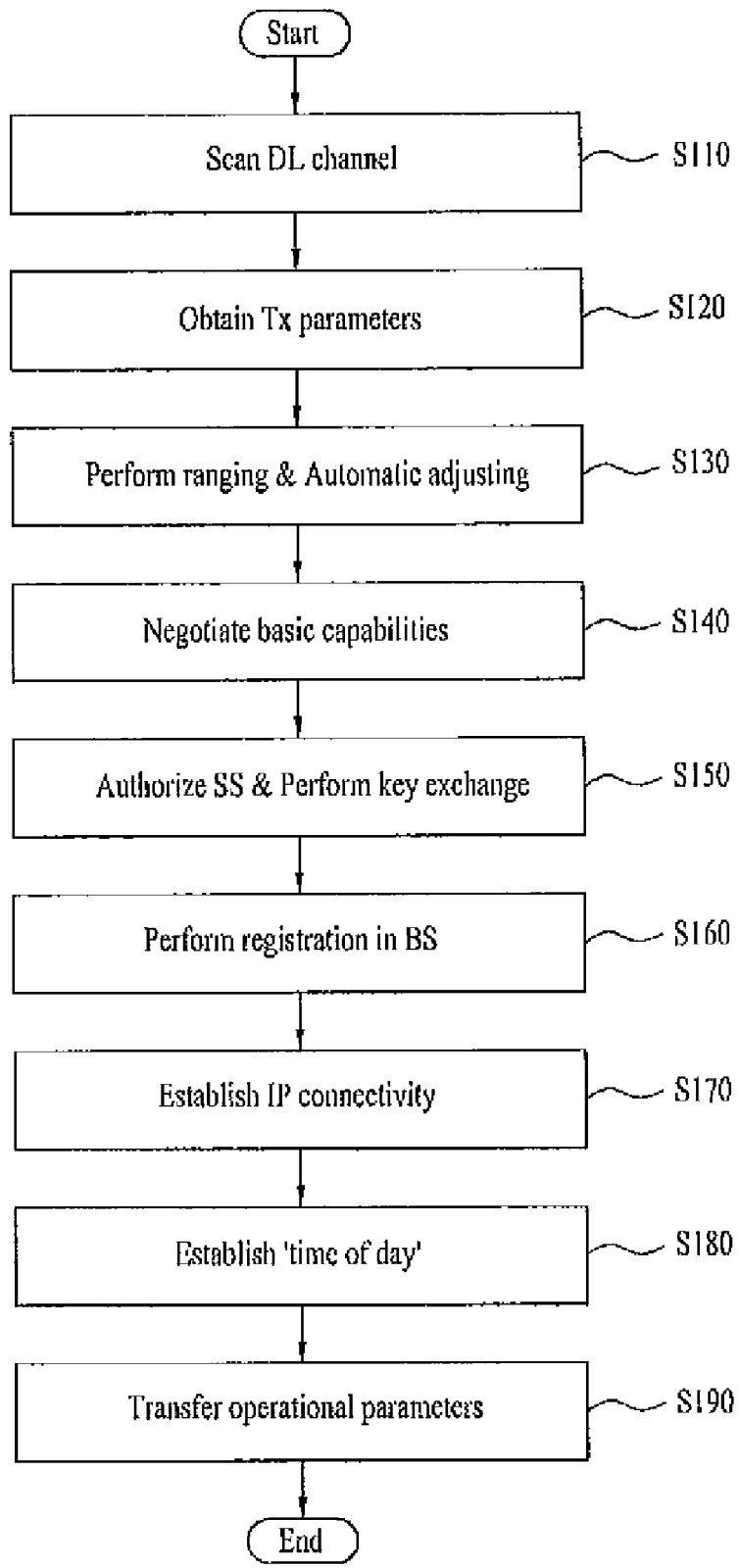
FIG. 1 is a flow chart illustrating the network entry and initialization process.
Figure 2:
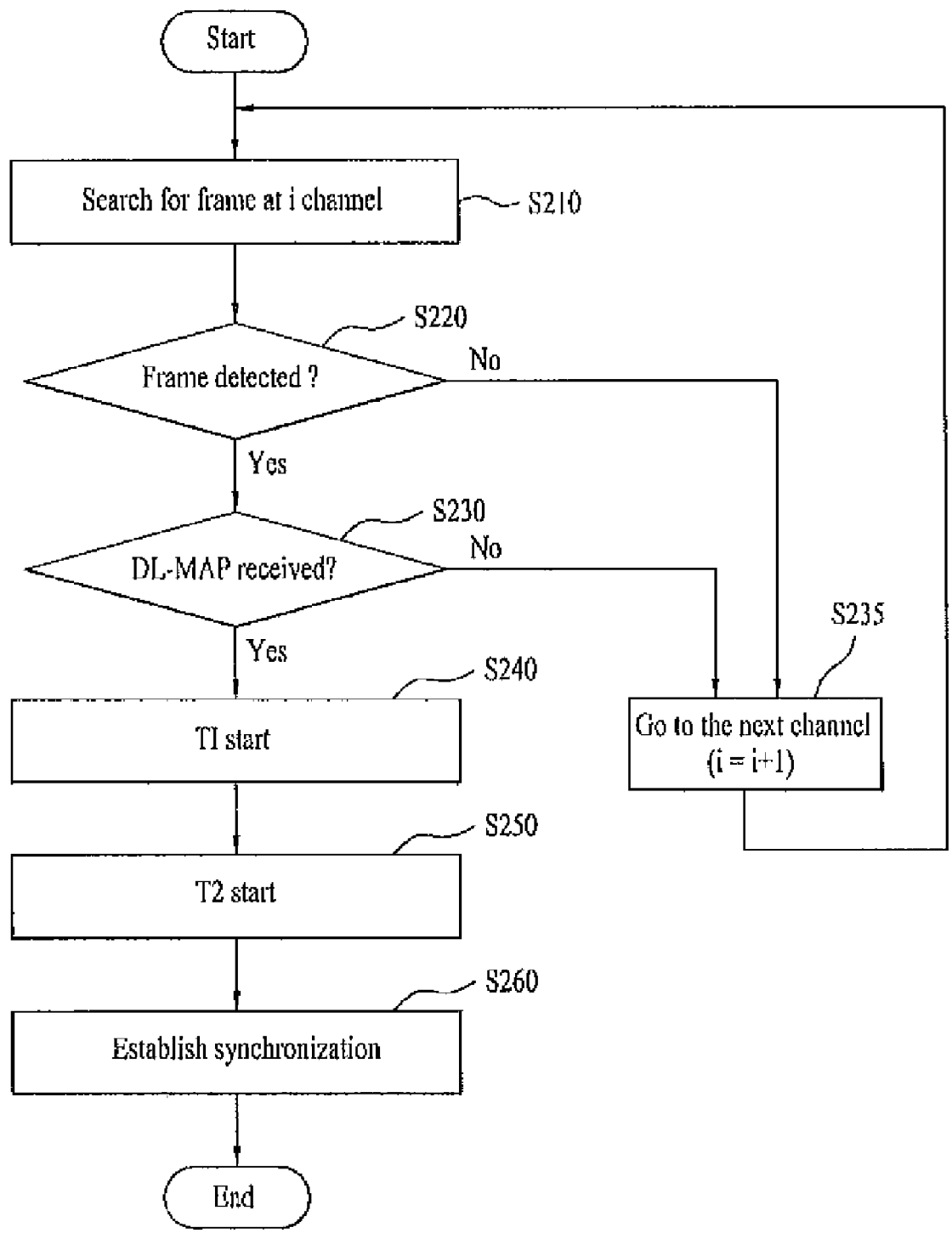
FIG. 2 is a flow chart illustrating a downlink synchronization process of a terminal.
Figure 3:
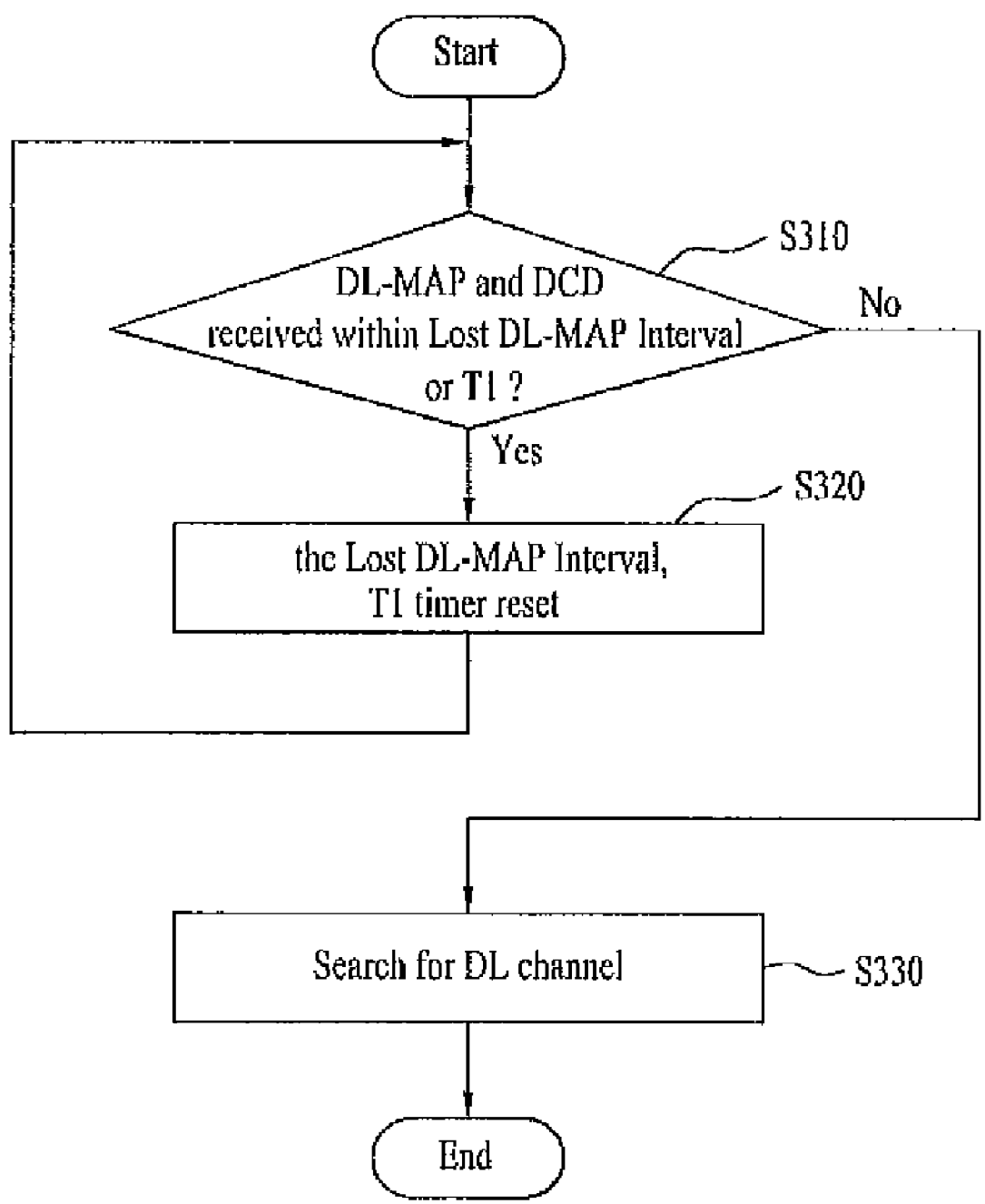
FIG. 3 is a flow chart illustrating a process for maintaining a downlink synchronization of FIG. 2.
Figure 4:
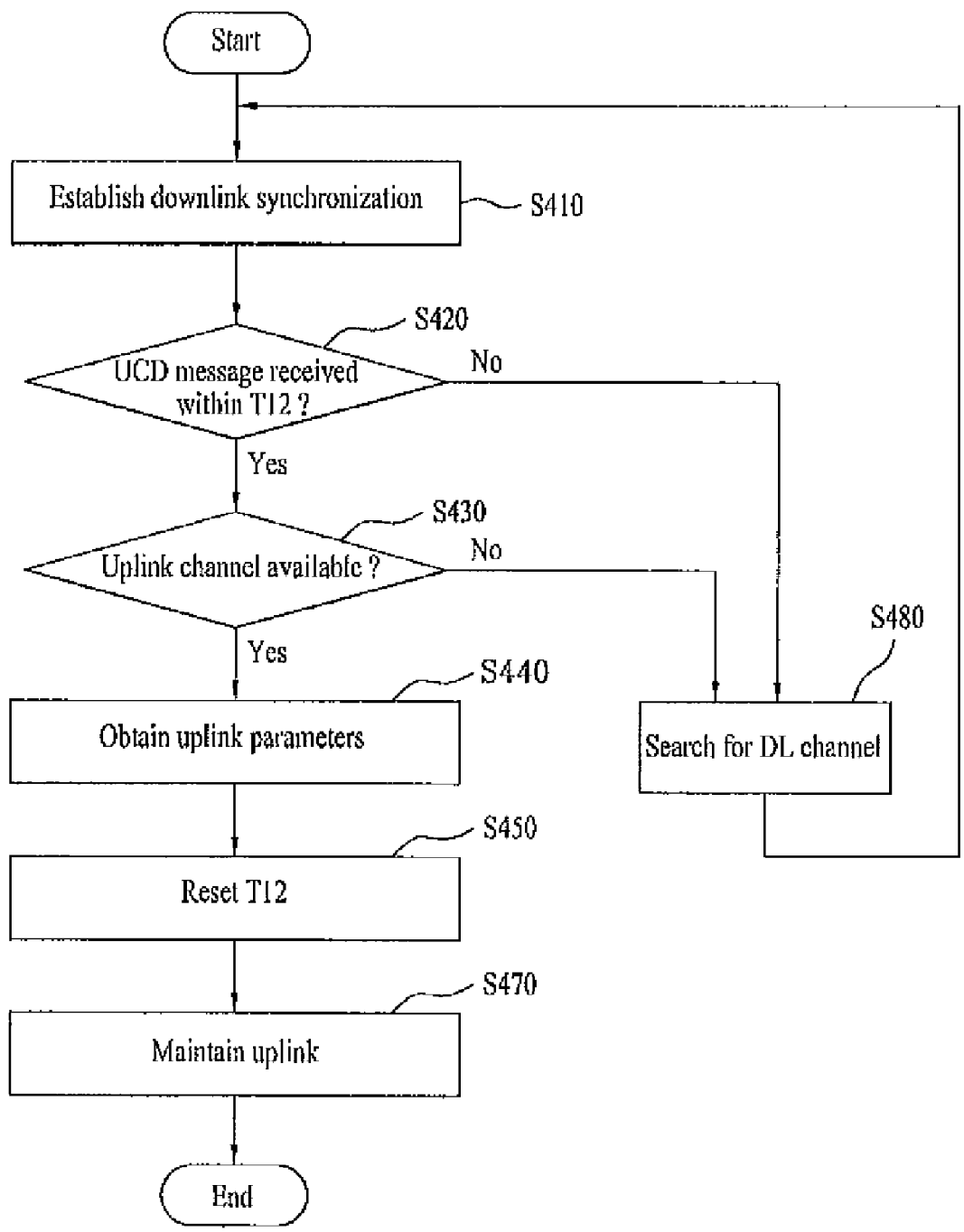
FIG. 4 is a flow chart illustrating a method for allowing a terminal to acquire uplink-associated parameters.
Figure 5:
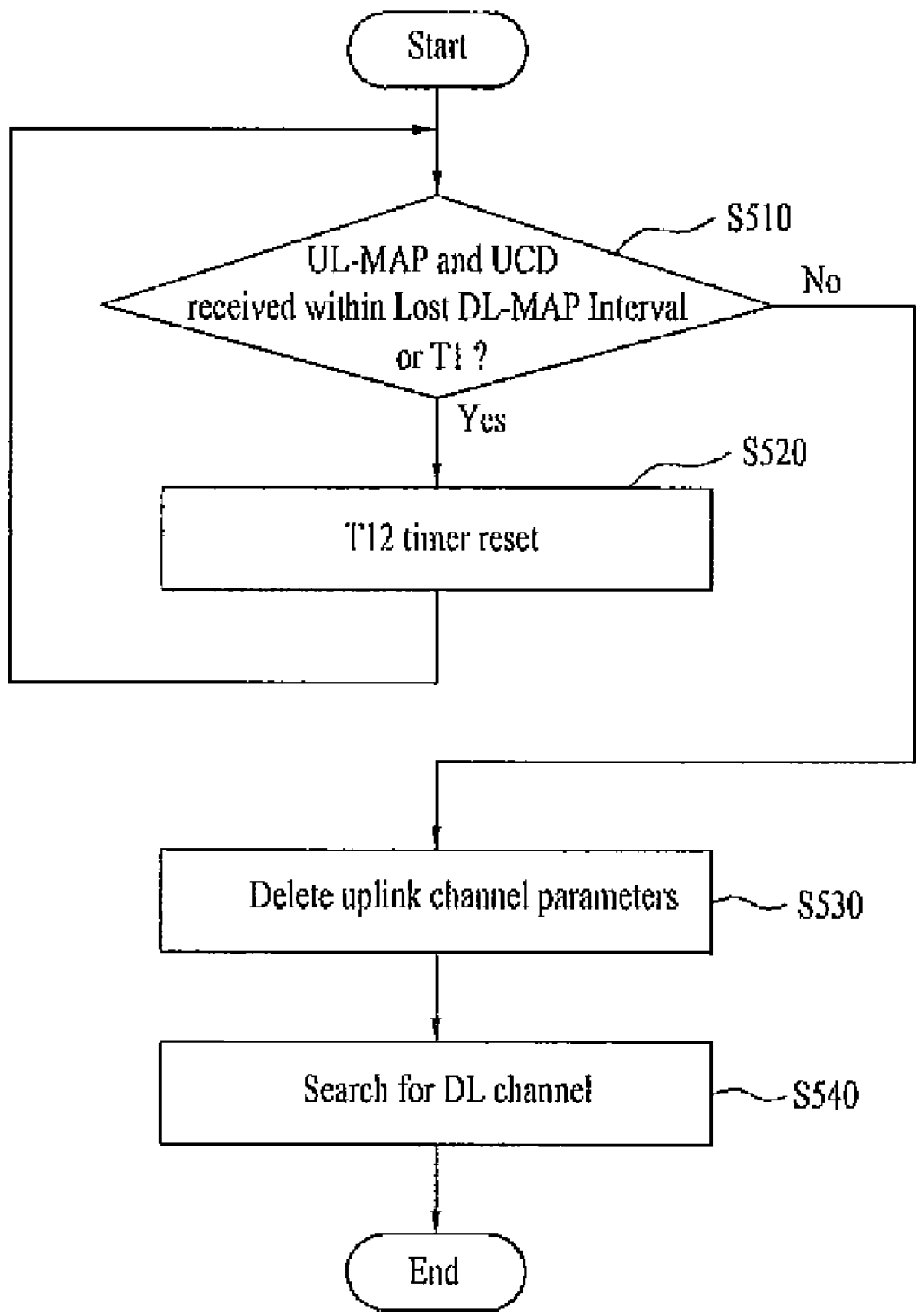
FIG. 5 is a flow chart illustrating a process for maintaining uplink-associated parameters of FIG. 4.
Figure 6:
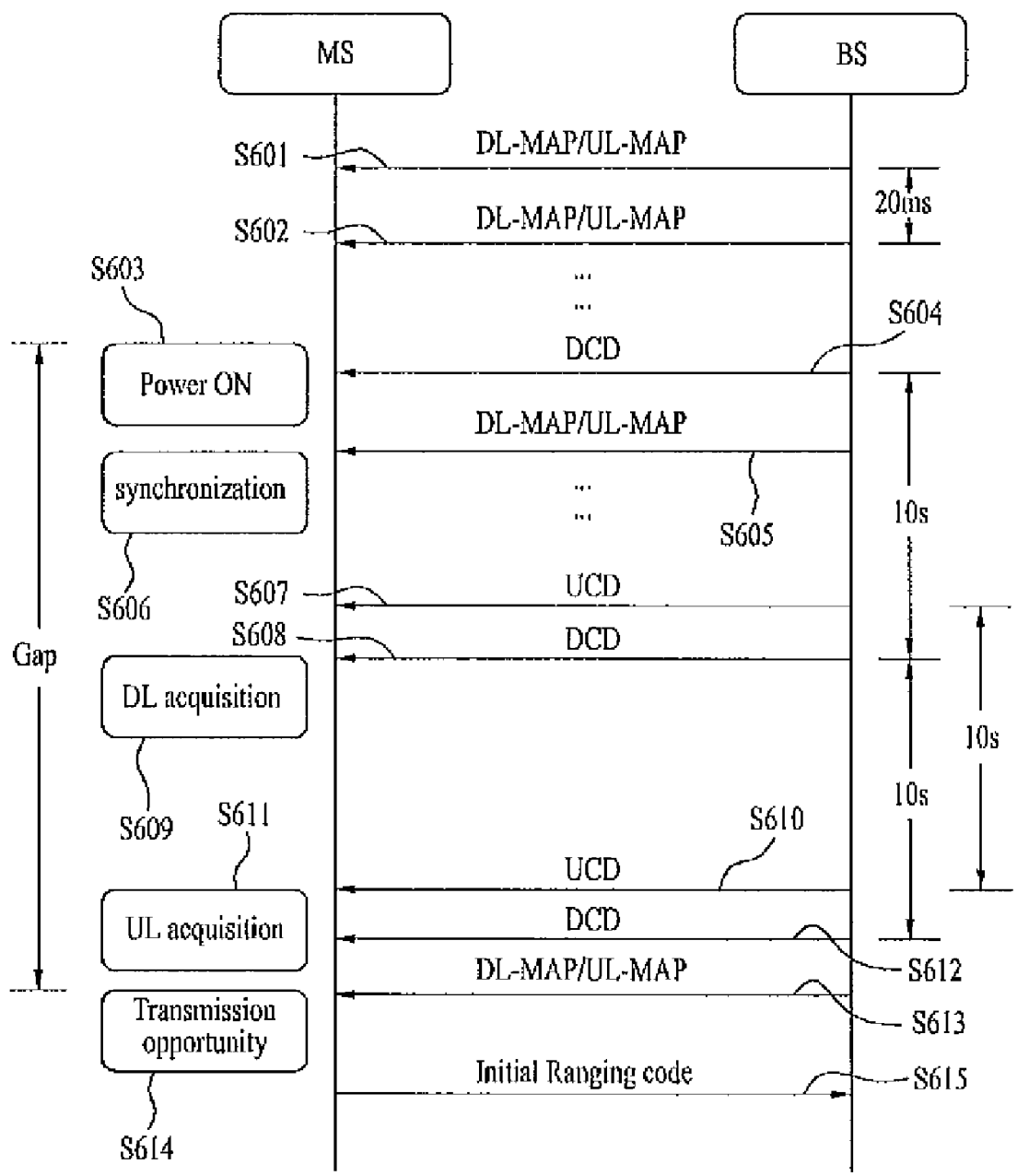
FIG. 6 is a conventional flow chart illustrating a network entry and initialization process.

Referring to FIG. 5, the base station (BS) decides transmission stat time points at which system information units of the individual groups will start transferring according to group information and the number of transmission times (i.e., 'Count' value) allocated to each group at step S810. In this case, the group information is equal to specific information indicating a classification result of system information (e.g., control information and burst profiles for the MS network entry and initialization process).

If the system information units are classified into three groups (i.e., a high repetition group (HRG), a middle repetition group (MRG), and a low repetition group (LRG)), the present invention can schedule DCD or UCD system information contained in the HRG at intervals of a frame in which a value calculated by the following equations 4 and 5 is '0'. In this case, each of 'DCD High Repeat Interval' and 'UCD High Repeat Interval' is defined by frame-based values according to a frame duration interval.

$$HRC_{DCD} = \text{Frame Number mod DCD High Repeat Interval} \quad [\text{Equation 4}]$$

$$HRC_{UCD} = \text{Frame Number mod UCD High Repeat Interval} \quad [\text{Equation 5}]$$

Next, the base station (BS) may transfer system information of a corresponding group using the MAP message at transmission times of individual groups at step S820.

In case of transmitting the system information using the MAP message, DCD system information may be contained in an extended-2 DIUC reserved area (i.e., 0x0F) of a downlink interval usage code (DIUC) '14'. Also, the above system information may be configured in the form of an information element (IE), such that the IE-formatted system information may be contained in the MAP, as shown in 'DL Channel information IE' of the following Table 1.

TABLE 1

| Syntax | Size | notes |
| --- | --- | --- |
| DL channel information IE { | — | — |
| Extended-2 DIUC | 4 | 0x0F |
| Length | 8 | |
| Reserved | 3 | |
| Encodings | variable | TLV |
| } | | |

In case of transmitting the system information using the MAP message, UCD system information may be contained in an extended-2 UIUC reserved area (i.e., 0x0D) of an uplink interval usage code (UIUC). Also, the above system information may be configured in the form of an information element (IE), such that the IE-formatted system information may be contained in the MAP, as shown in 'UL Channel information IE' of the following Table 2.

TABLE 2

| Syntax | Size | notes |
| --- | --- | --- |
| UL channel information IE { | — | — |
| Extended-2 UIUC | 4 | 0x0D |
| Length | 8 | |
| Reserved | 3 | |
| Encodings | variable | TLV |
| } | | |

The mobile station (MS), which has not recognized the extended-2 DIUC or the extended-2 UIUC, disregards the extended-2 DIUC or extended-2 UIUC information, has to receive the DCD or UCD message using the conventional method, and has to perform ranging. That is, in order to guarantee compatibility between the base station (BS) and the mobile station (MS), the base station (BS) may transmit the DCD or UCD message using the conventional method.

Figure 9:
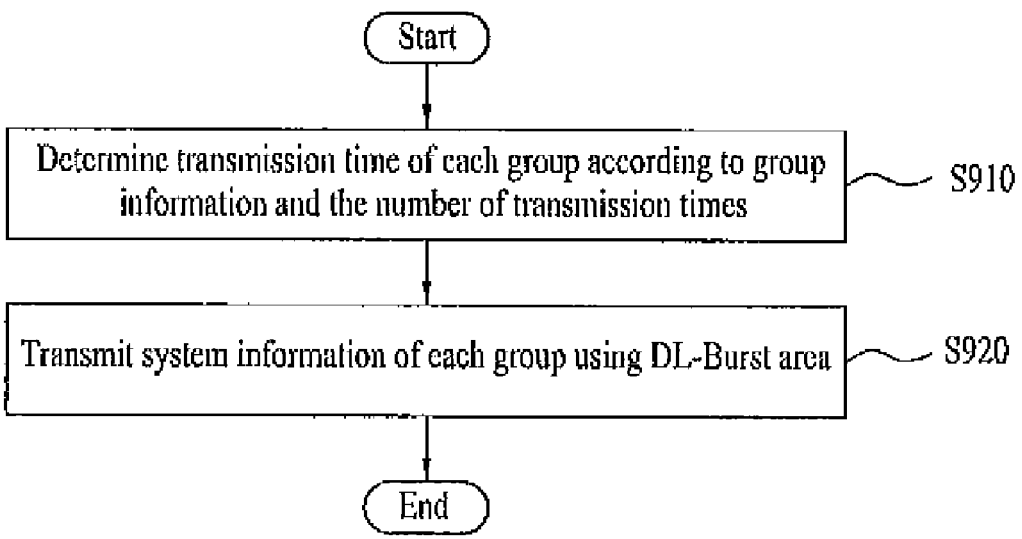
FIG. 9 is a flow chart illustrating a method for scheduling broadcast messages according to still another embodiment of the present invention.

In the meantime, the above-mentioned classified system information may also be broadcast using downlink bursts, as shown in FIG. 9.

FIG. 9 is a flow chart illustrating a method for scheduling broadcast messages according to still another embodiment of the present invention.

Referring to FIG. 8, the base station (BS) decides transmission start time points at which system information units of the individual groups will start transferring according to group information and the number of transmission times (i.e., 'Count' value) allocated to each group at step S910.

Next, the base station (BS) transmits system information of a corresponding group using a downlink burst area at a transmission time of each group at step S920. In this case, in order to guarantee compatibility between the base station (BS) and the mobile station (MS), the base station (BS) may also transmit all information of individual groups at transmission start time points at which the system information of a low repetition group (LRG) will start transferring.

Figure 10:
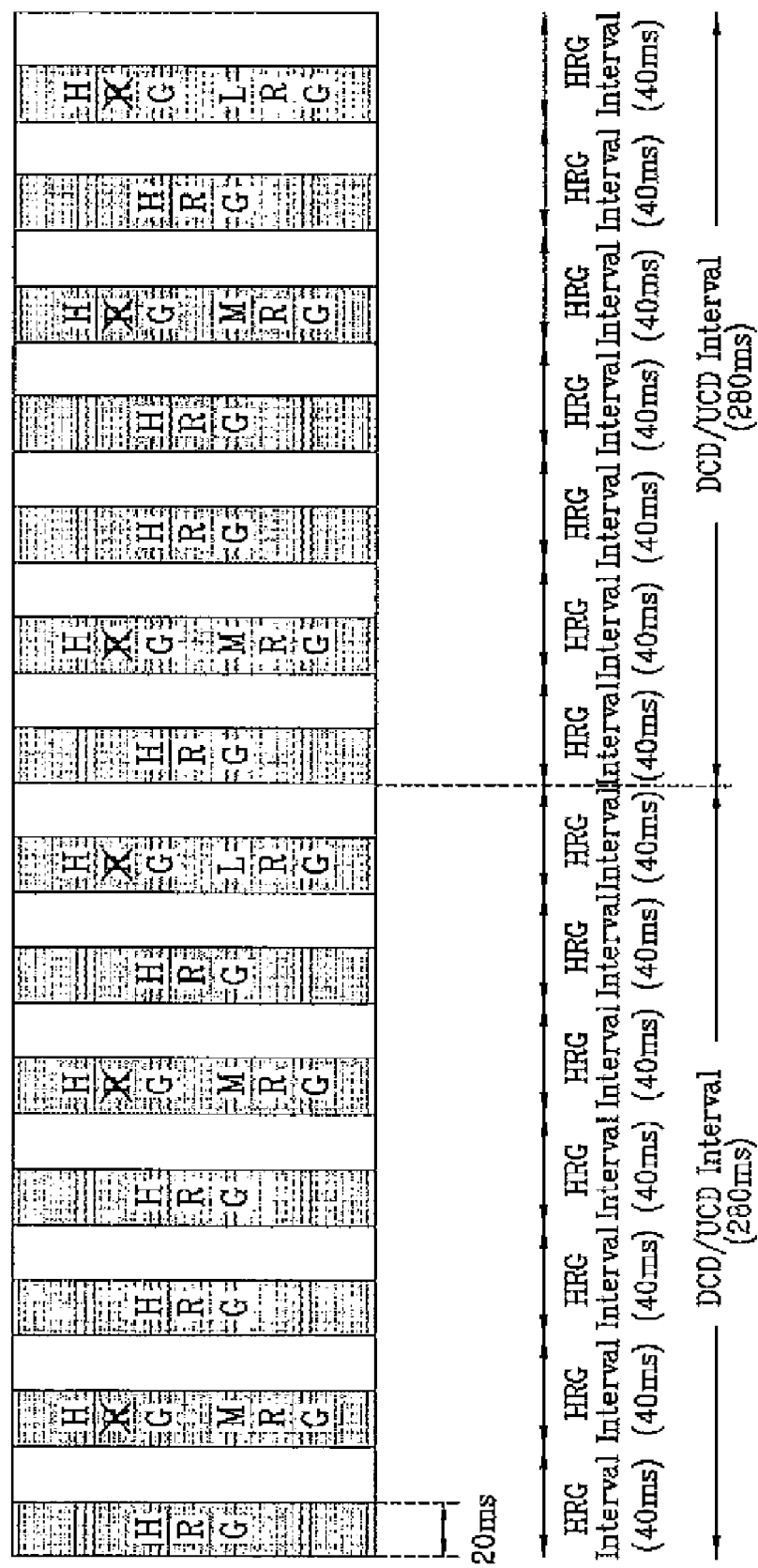
FIG. 10 is a conceptual diagram illustrating an exemplary method for scheduling broadcast messages using the method of FIG. 7.

FIG. 10 is a conceptual diagram illustrating an exemplary method for scheduling broadcast messages using the method of FIG. 7.

The system information transferred for the DCD or UCD transmission interval is one set of system information units of all groups and redundant system information which belongs to a high repetition group (HRG) and a middle repetition group (MRG). Therefore, downlink synchronization- and uplink parameter maintenance operations associated with T1 and T12 intervals for use in the network entry and initialization process can also be carried out.

FIG. 10 shows exemplary arrangement of allocated DCD or UCD system information according to one embodiment of the present invention. In this case, it is assumed that each of the DL-MAP and the UL-MAP is transferred at intervals of a frame having a frame duration interval of 20 ms. Also, it is assumed that the DCD or UCD transmission interval is set to 280 ms and a transmission interval of the high repetition group (HRG) is set to 2 frames. Finally, it is assumed that the number of transmission times of the middle repetition group (MRG) is set to 2.

Referring to FIG. 10, system information contained in the high repetition group (HRG) may be transferred at intervals of 2 frames. However, in order to transmit first system information two times and transmit second system information once during the DCD or UCD transmission interval, in which the first system information belongs to the middle repetition group (MRG) and the second system information belongs to the low repetition group (LRG), still another system information which belongs to the high repetition group (HRG) can be transferred four times.

According to embodiments of the present invention, the present invention classifies a variety of system information into several system information units, and transmits the classified system information units to a mobile station different times, such that it reduces a time consumed for the network entry and initialization process and acquires the dispersion effect of an initial ranging attempt from the viewpoint of a system.

Although the present invention has been disclosed by referring to the above-mentioned embodiments, it should be noted that the aforementioned embodiments have been disclosed for only illustrative purposes, and those skilled in the art will appreciate that various modifications, additions and substitutions are possible, without departing from the scope and spirit of the invention as disclosed in the accompanying claims. Thus, it is intended that the present invention covers the modifications and variations of this invention provided they come within the scope of the appended claims and their equivalents.

What is claimed is:

1. A method for scheduling broadcast messages including system information comprising: classifying a plurality of system information into one or more groups, in which each system information includes at least one of control information for a network entry and initialization of a mobile station (MS) or a burst profile; and
allocating different numbers of transmission times to the individual groups within a Downlink Channel Descriptor (DCD) or Uplink Channel Descriptor (UCD); and
determining transmission start times of system information of the individual groups according to the allocated transmission times,
wherein the determining the transmission start times includes performing a scheduling process, which allows system information classified into a specific group having the highest number of transmission times to have a transmission start time denoted by a specific frame interval, and allows system information classified into another group having the lowest number of transmission times to have the DCD or UCD transmission interval, and
wherein the system information classified into another group is broadcasted using resource which is occupied to broadcast the system information classified into the specific group.

2. A method for scheduling broadcast messages including system information comprising: determining transmission start times within a Downlink Channel Descriptor (DCD) or Uplink Channel Descriptor (UCD) transmission interval, at which the system information of the individual groups will start transferring, according to group information and the number of transmission times allocated to the individual groups, in which the group information is made by classifying the system information having at least one of control information for a network entry and initialization of a mobile station (MS) or a burst profile into one or more groups; and transmitting the system information of a corresponding group using an MAP message at a transmission start point of each group,
wherein the determining the transmission start times includes performing a scheduling process, which allows system information classified into a specific group having the highest number of transmission times to have a transmission start time denoted by a specific frame interval, and allows system information classified into another group having the lowest number of transmission times to have the DCD or UCD transmission interval, and
wherein the system information classified into another group is broadcasted using resource which is occupied to broadcast the system information classified into the specific group.

3. The method according to claim 2, wherein the system information includes system information of a DCD.

4. The method according to claim 3, wherein the group information allows the specific group having the highest number of transmission times, to have at least one of TTG, RTG, and EIRxPIR,max.

5. The method according to claim 3, wherein the DCD system information is contained in a DL channel information IE defined by an extended-2 DIUC reserved area from among downlink interval usage codes (DIUCs).

6. The method according to claim 2, wherein the system information includes system information of a UCD.

7. The method according to claim 6, wherein the group information allows the specific group having the highest number of transmission times to include information associated with an initial ranging and other information associated with a transmission power, in which the initial ranging-association information includes at least one of an initial ranging code, a start point of a ranging code group, and an initial ranging backoff start point.

8. The method according to claim 6, wherein the UCD system information is contained in a UL channel information IE defined by an extended-2 UIUC reserved area from among uplink interval usage codes (UIUCs).

9. A method for scheduling broadcast messages including system information comprising: determining transmission start times within a Downlink Channel Descriptor (DCD) or Uplink Channel Descriptor (UCD) transmission interval, at which the system information of the individual groups will start transferring, according to group information and the number of transmission times allocated to the individual groups, in which the group information is made by classifying the system information having at least one of control information for a network entry and initialization of a mobile station (MS) or a burst profile into one or more groups; and transmitting the system information of a corresponding group using a downlink burst area at a transmission start time of each group,
wherein the determining the transmission start times includes performing a scheduling process, which allows system information classified into a specific group having the highest number of transmission times to have a transmission start time denoted by a specific frame interval, and allows system information classified into another group having the lowest number of transmission times to have the DCD or UCD transmission interval, and
wherein the system information classified into the another group is broadcasted using resource which is occupied to broadcast the system information classified into the specific group.

10. The method according to claim 9, wherein the group information allows the specific group having the highest number of transmission times to include at least one of TTG, RTG, and EIRxPIR,max.

11. The method according to claim 9, wherein the specific group having the highest number of transmission times includes information associated with an initial ranging and other information associated with a transmission power, in which the initial ranging-association information includes at least one of an initial ranging code, a start point of a ranging code group, and an initial ranging backoff start point.

* * * * *